No Printed Specification Available
Sheet 1. 2 Sheets.
9174X
Z. Bliss.
Cloth Finishing Mach.
Patented Oct. 17, 1835.
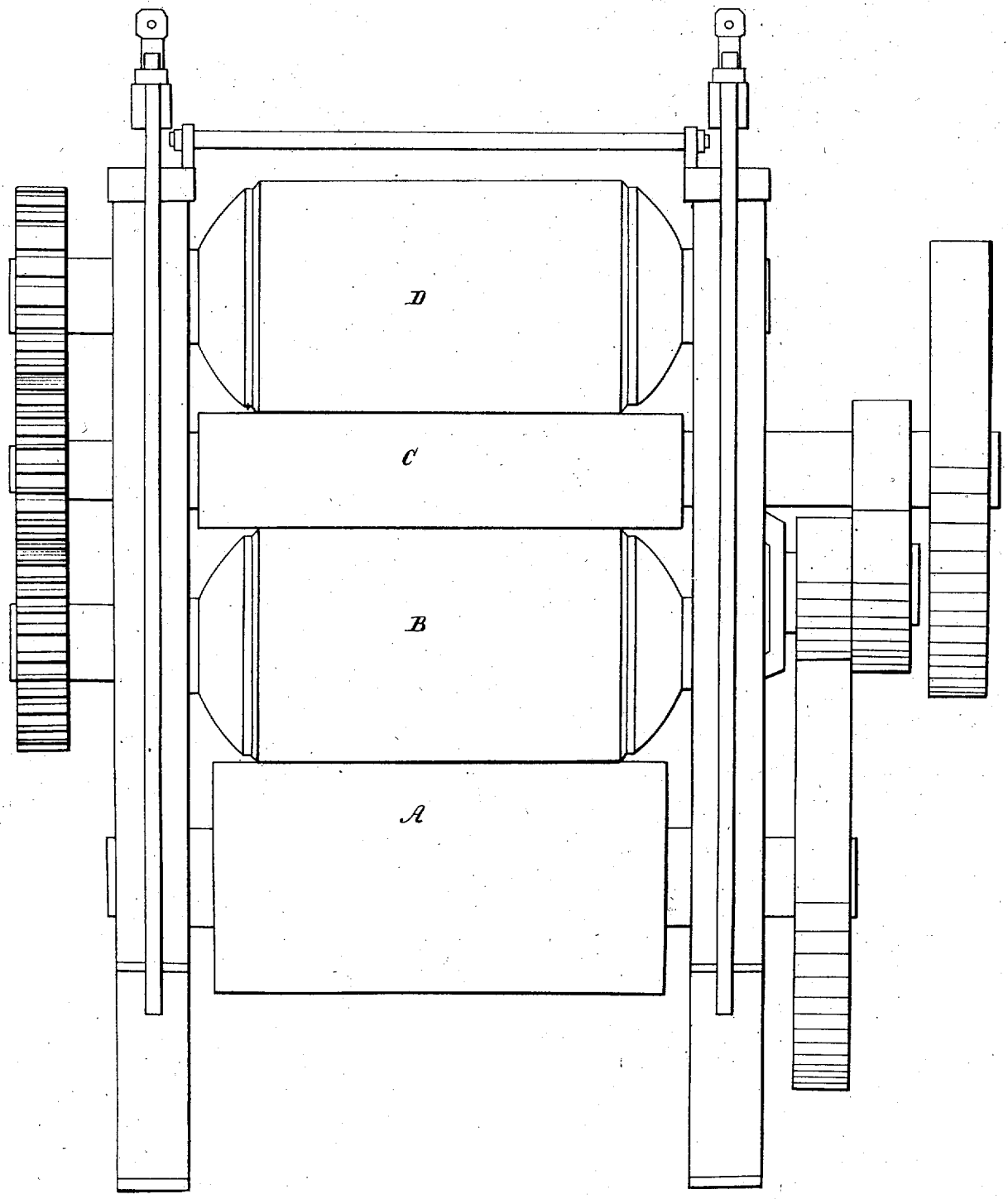

9174X
Sheet 2. 2 Sheets
Z. Bliss.
Cloth Finishing Mach.
Patented Oct. 17, 1835.
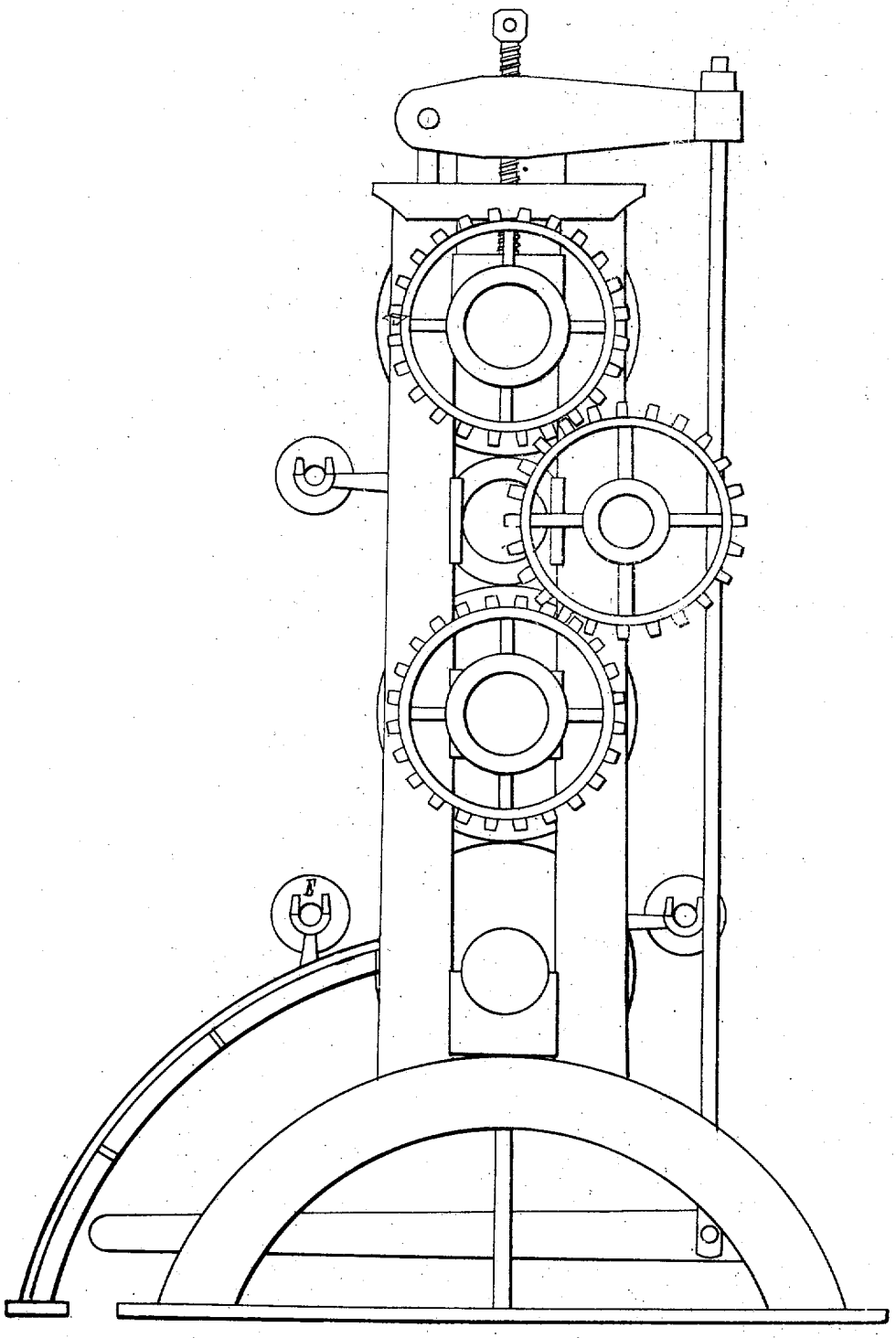

9174x Oct, 17, 1835

Zenas Bliss of Johnston. R. Island.

Letters Patent

The schedule referred to in these Letters Patent, and making part of the same, containing a description in the words of the said Zenas Bliss himself, of his improvement in the machine for Calendering Cloth —

To all to whom these presents shall come: Be it known that I Zenas Bliss of Johnston in the County of Providence and State of Rhode Island have invented a new and useful improvement on calendering cloth and the following is a full and exact description of the construction and operation of the double glazed Calendering machine as invented or improved by me. A. B. and C. (in the drawing annexed) represents three cylinders. The cloth is received first between the cylinders A & B. it then passes between B & C and while passing between them it receives the glaze which is called the finishing it then passes between C & D and receives another glazing —

In order to understand more perfectly the operation of the machine I will give a description of the calender now in general use. The cylinders A. B & C (in the same drawing annexed) contain all the cylinders belonging to the machine. The cylinder D is the improvement in my machine. In the common machine the cloth enters between A & B. and going round B. comes out from between B & C. where it receives the glazing. By this process the cloth receives only a single glazing it is therefore necessary to pass the cloth twice through the cylinders in order to give it a smooth surface. Again in relation to the pressure on the necks of the cylinders; A & C. receive the whole pressure C. making four revolutions to A. one; consequently there is four times the friction on the necks of C to that of A. again the wear of the boxes in the machine in general use is very great. For instance a pair of composition boxes weighing 100 pounds on the necks of C. do not last more than sixty days. With all this the common machine will not average dressing the year more than two hundred pieces of cloth per day.

The improvements of my calender over the one in general use are these The cloth receives first double the glazing and a much superior finish

9174X n passing through the cylinder once instead of twice in the common machine
Two pieces of cloth may pass through my machine at one and the same
ind both receive precisely the same finish as one piece in the common ma-
chine. another decided improvement relates to the pressure upon the necks of
he cylinders. In my machine. A & D. receives the whole pressure & move with
ess velocity, and as D moves with one fourth less velocity than in the common
machine the friction is decreased in propotion as one to four.
Another improvement, which is not only a saving of time labor, and money
s this. in the wear of the boxes, in the common machine on the necks of C.
they wear out as before stated in sixty days whereas in my machine on the
necks of D. they will last two years - As to the quantity of worked performed
y my machine. I am fully satisfied from experiments within my own knowl-
edge & when I have myself superintended at my calendering establishment
hat said machine which has been in operation for some weeks has per-
formed double the amount of work, with the same water power & the same
ime which the common machine performed. The only additional expense
s the cylinder D. and some trifling gearing in amount about one fifth
extra.

Witnesses
Henry L. Bowen
Thomas White

Zenas Bliss (Drawing)

[illegible]

658 [illegible]